Jan. 8, 1952

G. W. PENNEY 2,581,813

ISOTOPE SEPARATION

Filed May 8, 1943

WITNESSES:

INVENTOR
Gaylord W. Penney.
BY
ATTORNEY

Jan. 8, 1952 G. W. PENNEY 2,581,813
ISOTOPE SEPARATION
Filed May 8, 1943 2 SHEETS—SHEET 2

WITNESSES:
*Leon M. Garman*

INVENTOR
*Gaylord W. Penney.*
BY
*F. W. Lyle.*
ATTORNEY

Patented Jan. 8, 1952

2,581,813

UNITED STATES PATENT OFFICE 2,581,813

ISOTOPE SEPARATION

Gaylord W. Penney, Wilkinsburg, Pa., assignor to Westinghouse Electric Corporation, East Pittsburgh, Pa., a corporation of Pennsylvania Application May 8, 1943, Serial No. 486,185

12 Claims. (Cl. 250—41.9)

My invention relates to electrical discharge devices and, in particular, to arrangements in which the combined action of electric and magnetic fields is employed to separate from each other the isotopes of certain substances.

When a charged electrical body, such, for example, as the ion formed from a molecule of one of the chemical elements, moves at right angles to a magnetic field of uniform intensity, the charged body tends to describe a circular path which it will repeat with a constant frequency $f$ given by the following equation:

(1) $$f = \frac{He}{2\pi m}$$

where H is the magnetic field strength; $e$ the charge on the ion; M the mass of the ion. If the ion is subjected to the action of an alternating electric field in a plane perpendicular to the magnetic field, and having a frequency equal to $f$, the radius of the path continually increases without limit.

Certain of the chemical elements are found to be mixtures of isotopes; that is to say, to be made up of atoms having substantially identical chemical properties but having masses slightly different from each other. The separation of two isotopes of an element presents a problem of extreme difficulty.

If the two isotopes are given electric charges (for example, by depriving an atom of each of one electron, thereby transforming them into ions), Equation 1 shows that, because they have the same charge $e$ but different masses M, they will have different resonant frequencies in any magnetic field of strength H. It is possible to show that if two bodies carrying equal electric charges but having slightly different masses are acted upon by a uniform magnetic field combined with an alternating electric field having divergent lines of force and a frequency which is intermediate between their natural frequencies, the lighter will experience a net electrostatic force tending to move it in the direction of convergence of the electric field, while the heavier experiences a net electrostatic force in the divergent direction of the field. I have conceived a possibility of making use of these net forces to cause separation between two isotopes. In general, I make use of the above-mentioned forces by projecting ionized molecules of the two isotopes into a combined magnetic and electric field of the above-mentioned character in an electrical discharge vessel wherein I provide suitable arrangements for collecting the two isotopes.

One object of my invention is, accordingly, to provide an arrangement in which a combined magnetic and alternating electric field are employed to effect separation of isotopes.

Another object of my invention is to provide an arrangement in which the isotopes of uranium may be separated from each other.

Other objects of my invention will become apparent upon reading the following description taken in connection with the drawings, in which.

Figure 1:
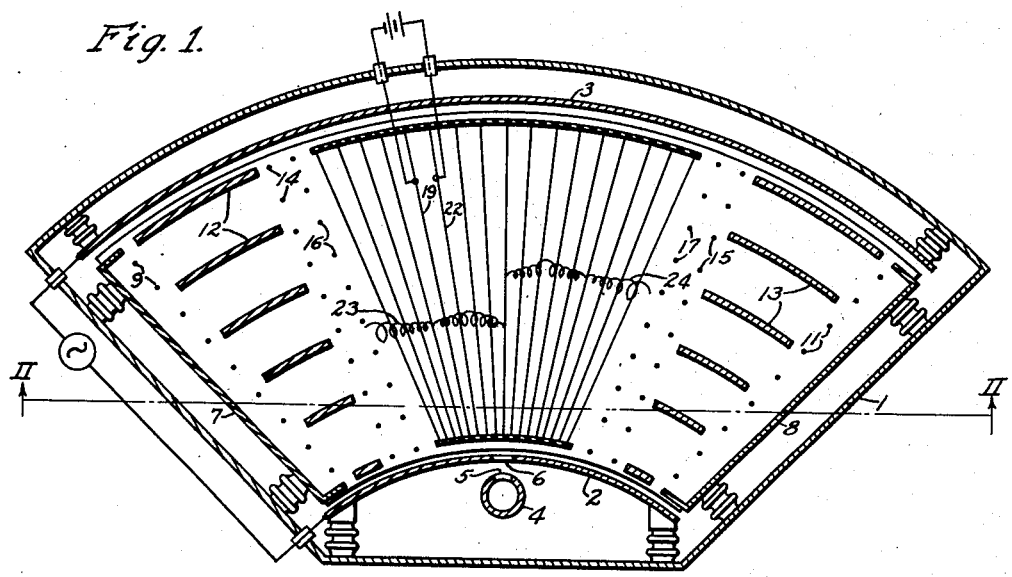
Figure 1 shows a view in horizontal section along line I—I of Fig. 2 of an electrical discharge device in which the principles of my invention may be utilized.
Figure 2:
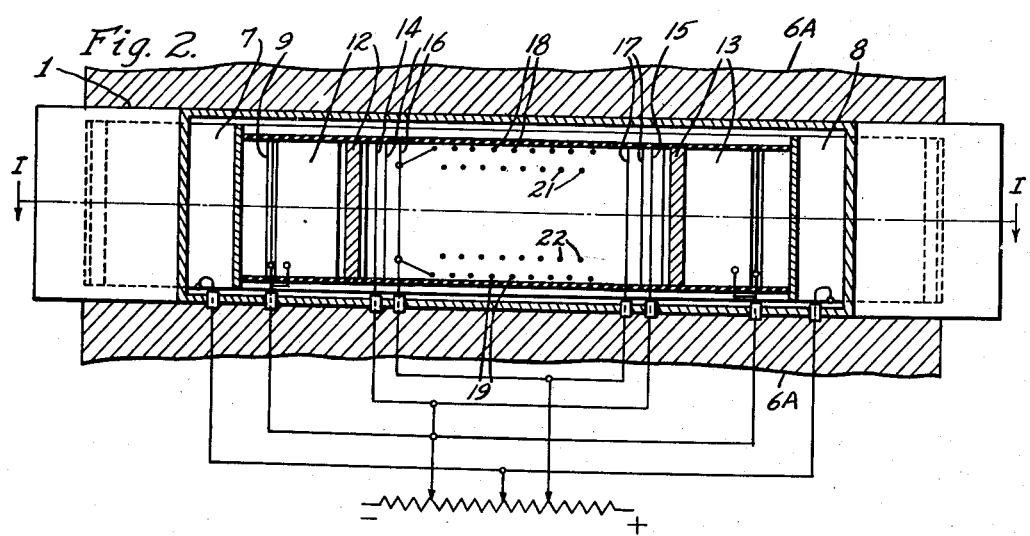
Fig. 2 shows a view partly in elevation and partly in section along the line II—II of Fig. 1.

Referring in detail to Figs. 1 and 2 of the drawing, I provide a vacuum-tight container 1 which may suitably be of sector shape and of insulating material, or may be of some metal, such, for example, as copper, in which insulators support a pair of substantially concentric electrodes 2, 3. Means (not shown) are provided for impressing an alternating voltage between the electrodes 2, 3 through suitable in-leading conductors which are omitted from the drawing for the sake of simplicity. Adjacent the concave side of the electrode 2 is provided a duct 4 of refractory material leading from an enclosure (not shown) in which the material containing the isotopes to be separated, for example, uranium, may be heated by any means well known in the art to a sufficient temperature to produce a vapor of substantial vapor pressure. Aligned openings 5 and 6, respectively, in the wall of the duct 4 and in the electrode 2 permit this vapor to flow into the space between the two electrodes 2, 3. The container 1 is preferably evacuated to such a degree as to prevent any deleterious collisions with molecules. For certain cases it will be found desirable, however, to maintain a substantial amount of a light gas, such as helium within the container 1 to promote ionization.

The container 1 fits closely between the poles of a direct-current or permanent magnet (showing omitted for the sake of simplicity) which produces a uniform magnetic field perpendicular to the plane of Fig. 1 throughout substantially the entire space between the electrodes 2 and 3.

Adjacent each end of the container 1 is insulatingly supported collector-electrodes 7 and 8 adapted to collect the respective isotopes of the material under investigation. The electrodes 7, 8 are preferably made a few volts negative relative to the grids 16 and 17. Parallel to the collector-electrodes 7 and 8 are positioned the conductors of a pair of grids 9, 11, supported on insulators and respectively provided with in-leading wires (not shown) through the container 1 by which their potentials may be suitably fixed. Immediately in front of the grids 9, 11 are insulatingly supported normal to the plane of Fig. 1 a series of baffles 12, 13 substantially parallel to the concentric electrodes 2 and 3. The partitions 12, 13 leave passages between them through which the isotopic ions can move from the central portion of the container 1 to the collector-electrodes 7, 8. In front of the respective partitions 12, 13 and substantially parallel to the collector-electrodes 7 and 8 are positioned the conductors of grids 14, 15 which are provided with in-leading conductors (not shown) through the walls of the container 1 by which their potential may be fixed at will. This potential may suitably be several thousand volts negative relative to the above-mentioned grids 16 and 17, and be the same as that of baffles 12, 13 and grids 9, 11. In front of the grids 14, 15 and substantially parallel thereto are provided a set of grids 16, 17 which are likewise insulatingly supported and provided with in-leading conductors (not shown) through the walls of the container 1 so that their potential may be fixed at will.

Parallel to the upper and lower faces of the container 1 in the region between the grids 16, 17 are positioned a set of electron-emissive filaments 18, 19 provided with in-leading conductors (not shown) through the walls of the container 1 and insulatingly supported so that their potential may be fixed at will. Usually their potential will be substantially the same as, or slightly positive to, that of the above-mentioned grids 16 and 17.

Parallel to and in staggered relation to the filaments 18, 19 are provided the conductors of a pair of grids 21, 22 insulatingly supported and provided with in-leading conductors (not shown) through the walls of the container by which their potential may be fixed at will. To illustrate by a specific instance the grids 21 and 22 may be made 300 volts positive with respect to filaments 18, 19.

The mode of operation of the above-described structure in separating isotopes is as follows: The isotopic atoms diffuse from the duct 4 through the openings 5 and 6 into the central portion of the chamber 1. The potential difference of the grids 21 and 22 relative to filaments 18 and 19 is made sufficient so that electrons from the latter are accelerated enough so that a substantial number of the atoms is ionized. The electrons congregate between grids 21 and 22 and attract the more weighty positive ions to that region. Both electrons and ions acquire velocities in the space traversed by the magnetic field under the influence of the electric field between electrodes 2 and 3. The charged ions accordingly tend to move under the influence of the magnetic field in curved paths and, as previously stated, the effect of the divergent alternating electric field is to produce a net force on the lighter ions in the direction of the electrodes 2 and of the heavier ions in the direction of the electrode 3. The presence of the magnetic field causes the velocity in the direction of the last-mentioned electric field to be transformed into paths, as shown at 23 and 24, by which the respective isotopes are moved transversely to the alternating electric field toward the grids 16, 17, the lighter isotope moving toward one set of the above-mentioned collector electrodes and the heavier isotope toward the other. The diameter of the spirals alternately increases and decreases as the isotope moves toward the collector electrode.

The baffles 12, 13 will intercept molecules which move in straight lines, and will also intercept isotopic ions carrying twice the electron-charge, such doubly-charged isotopes being formed occasionally in the discharge.

To illustrate the principles of my invention by a specific example, separation isotopes of atoms having a mass of the order of 200 to 250 (such as uranium) would suitably use a magnetic field strength of the order of 10,000 gausses; the alternating electric field of the order of one volt per cm. and a frequency of the order of 65,000 cycles per second.

Referring to the modification of my invention shown in Figs. 3 and 4, a vacuum type container 1 of the same general type as that previously described in connection with Figs. 1 and 2 contains a pair of substantially parallel plates 2 and 3 which are insulatingly supported, the plate numbered 2 being considerably shorter than the plate numbered 3. The plates 2 and 3 perform a function very similar to that already described in connection with the similarly numbered electrodes 2 and 3 in Fig. 1 but differ from the latter in that while producing a divergent electric field the plane of divergence of this field is parallel to the lines of force of the magnetic field instead of perpendicular thereto as in the Fig. 1 modification. In other words, the plane of divergence of the electric field between the electrodes 2 and 3 is normal to the paper in Fig. 3 and parallel to the plane of the paper in Fig. 4.

Figure 4:
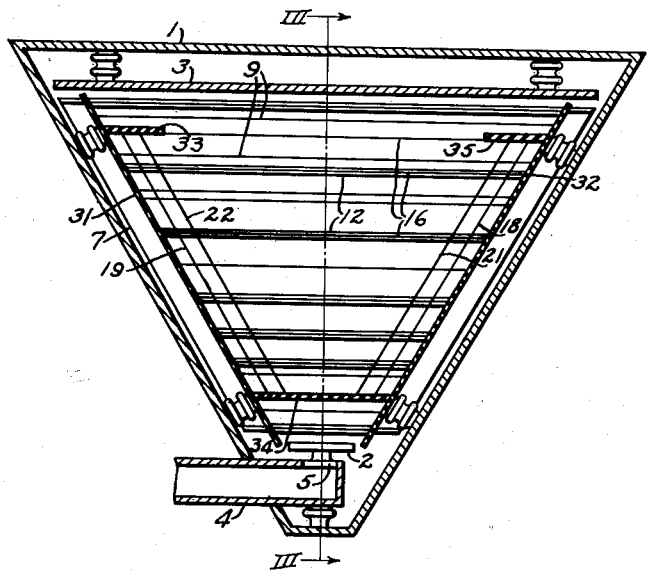
Fig. 4 shows a view along the line IV—IV of Fig. 3.

Adjacent the two diverging sides of the casing 1 in Fig. 4 are positioned the poles of a direct current electromagnet (not shown) which produces a magnetic field in the plane of Fig. 4 in the space between the electrodes 2 and 3. A duct 4 similar to that already described in Fig. 1 is provided which leads from an enclosure (not shown) from which vapors of the material containing the isotopes to be separated is heated, the vapor flowing through the duct 4 and through the opening 5 in the electrode 2 upward into the space between the electrodes 2 and 3. A pair of collector electrodes 7 and 8 analogous to the electrodes of the same number in Fig. 1 are insulatingly supported parallel to the ends of the enclosure 1, and these are provided with in-leading wires analogous to those already described for the Fig. 1 modification. Parallel to the electrodes 7, 8 are positioned the conductors 9, 11 of a pair of grids which are analogous to and provided with in-leading wires (not shown) similar to the grids 9 and 11 already described in Fig. 1. Immediately in front of the grids 9 and 11 are insulatingly supported a series of baffles 12, 13 analogous to the baffles of the same number in Fig. 1. In front of the baffles 12, 13 are positioned the conductors of grids 14, 15 which are similar in function and provided with similar in-leading conductors to those of the similarly numbered grids in Fig. 1. In front of the grids 14, 15 and substantially parallel thereto are provided a second set of grids 16, 17 provided with in-leading conductors (not shown) so that their potential may be fixed at will and in a manner similar to that of the grids 16, 17 in Fig. 1.

Insulatingly supported parallel to the slanting walls of the container 1 are positioned a pair of end partitions 31, 32 which tend to retain the vapors entering through the opening 5 to the central region of the container 1. Supported by insulators 33, 34, 35 on the end plates 31 and 32 are the parallel electron emissive filaments 18, 19 provided with in-leading conductors (not shown), the function of the filaments 18, 19 being similar to those of the similarly numbered filaments in the Fig. 1 modification. Parallel to the filaments 18, 19 and more remote from the partitions 31, 32 are insulatingly supported the conductors 21, 22 of a pair of grids. The potential and function of the grids 21, 22 are similar to those of the similarly numbered grids in Fig. 1.

Figure 3:
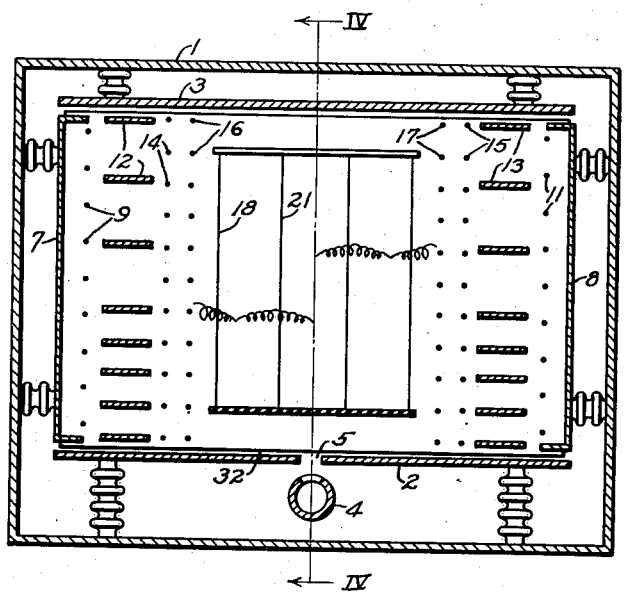
Fig. 3 shows a view in vertical section along line III—III of Fig. 4 of another embodiment of the principles of my invention.

The mode of operation of the Fig. 3 modification will probably be evident to those skilled in the art from the preceding description of the Fig. 1 modification. Molecules of the isotopes traveling out of the orifice 5 will be ionized by collision with electrons emanating from the thermionically emission filaments 18, 19. These ions will then move under the impulse of the electric field between the electrodes 2, 3; will be acted upon by the magnetic field within the container 1, and the heavier isotopes will move toward one of the collector electrodes such as 7 while the lighter isotopes move toward the other collector electrode 8. The function of the baffles 12, 13 and the grids 9, 11, 14, 15, 16, 17 is similar in the Fig. 3 modification to the functions already described for the similarly numbered elements in Fig. 1. The values of the electrical quantities described in connection with Fig. 1 apply also to the Fig. 3 modification.

I claim as my invention:

1. In an electrical discharge device, means for producing a substantially uniform direct-current magnetic field, means for producing an alternating divergent electrical field substantially at right angles thereto, means to furnish ions to the space occupied by said fields, and a collector electrode adapted to receive said ions moving through said field.

2. In an electrical discharge device, means for producing a substantially uniform direct-current magnetic field, means for producing an alternating divergent electrical field substantially at right angles thereto, means to furnish ions to the space occupied by said fields, a collector electrode adapted to receive said ions moving through said field, and means to produce a direct-current field substantially perpendicular to said alternating field and said magnetic field.

3. In an electrical discharge device, means for producing a substantially uniform direct-current magnetic field, means for producing an alternating divergent electrical field substantially at right angles thereto, means to supply atoms to the space occupied by said fields, an electron emitter and an electrode positive relative thereto adapted to cause ionization of said atoms, and means to produce a direct-current field substantially perpendicular to said alternating field and said magnetic field.

4. In an electrical discharge device, means for producing a substantially uniform direct-current magnetic field, means for producing an alternating divergent electrical field substantially at right angles thereto, means to supply atoms to the space occupied by said fields, an electron emitter and an electrode positive relative thereto adapted to cause ionization of said atoms, a collector electrode and means for maintaining it substantially at the potential of said electron emitter, and means to produce a direct-current electric field perpendicular to said alternating field and said magnetic field.

5. An electric discharge device comprising means to produce a substantially uniform direct-current magnetic field, a pair of electrodes substantially different in size and means to produce therebetween an alternating electric field substantially perpendicular to said magnetic field, means to supply atoms to the region occupied by said fields, an electron emitter and an electrode positive relative thereto adapted to produce an electronic discharge in the region occupied by said atoms, means to produce a direct-current electric field substantially normal to said magnetic field and said alternating field, and a collector electrode positioned to receive electrified particles moving in response to the last-mentioned electric field.

6. An isotope separating apparatus comprising means for producing a substantially uniform direct-current magnetic field, means for producing an alternating divergent electric field substantially normal thereto, means to furnish ions to the region occupied by said magnetic and electric fields, means to produce a direct-current electric field substantially normal to said magnetic field and said alternating field, and a collector electrode positioned to receive ions moving under influence of the last-mentioned field.

7. An isotope separating apparatus comprising means for producing a substantially uniform direct-current magnetic field, means for producing an alternating divergent electric field substantially normal thereto, means to supply atoms to the region occupied by said fields, an electron emitter and an anode positive thereto for causing ionization of said atoms, means to produce a direct-current electric field substantially normal to said magnetic field and said alternating field, and a collector electrode positioned to receive ions moving under influence of the both fields.

8. An isotope separating apparatus comprising means for producing a substantially uniform direct-current magnetic field, means for producing an alternating divergent electric field substantially normal thereto, means to supply atoms to the region occupied by said fields, an electron emitter and an anode positive thereto for causing ionization of said atoms, means to produce a direct-current field substantially normal to said magnetic field and said alternating field, and a collector electrode positioned transverse to the last-mentioned field and means for maintaining it near the potential of said electron emitter.

9. An isotope separating apparatus comprising means for producing a substantially uniform direct-current magnetic field, means for producing an alternating divergent electric field substantially normal thereto, means to supply atoms to the region occupied by said fields, an electron emitter and an anode positive thereto for causing ionization of said atoms, a grid electrode having its plane substantially parallel to said magnetic field and said alternating field, means to impress on said grid electrode a substantial negative potential relative to said electron emitter, and a collector electrode substantially parallel to said grid electrode and and means for maintaining said collector electrode substantially at the potential of said electron emitter.

10. An isotope separating apparatus comprising means for producing a substantially uniform direct-current magnetic field, means for producing an alternating divergent electric field substantially normal thereto, means to supply atoms to the region occupied by said fields, an electron emitter and an anode positive thereto for causing ionization of said atoms, a grid electrode having its plane substantially parallel to said magnetic field and said alternating field, means to impress on said grid electrode a substantial negative potential relative to said electron emitter, a collector electrode substantially parallel to said grid electrode and means for maintaining said collector electrode substantially at the potential of said electron emitter, and baffles located between said grid electrode and said collector electrode and substantially normal to said grid electrode.

11. In an isotope separating device, means for producing a substantially uniform direct-current magnetic field, a smaller electrode and a larger electrode adapted to produce a divergent alternating-electric field substantially normal to said magnetic field, a gaseous atmosphere between said electrodes, an electron emitter and an anode positive thereto adapted to produce an electronic discharge through said gaseous atmosphere, perforate electrodes provided with means for impressing an electrical potential between them and said electron emitter and positioned to produce an electric field substantially normal to said magnetic and said alternating field, and a collector electrode substantially parallel to said perforate electrodes and provided with means for maintaining it substantially at the potential of said electron emitter.

12. In an isotope separating device, means for producing a substantially uniform direct-current magnetic field, a smaller electrode and a larger electrode adapted to produce a divergent alternating-electric field substantially normal to said magnetic field, a gaseous atmosphere between said electrodes, an electron emitter and an anode positive thereto adapted to produce an electronic discharge through said gaseous atmosphere, perforate electrodes provided with means for impressing electrical potentials between them and said electron emitter and positioned to produce an electric field substantially normal to said magnetic and said alternating field, a collector electrode substantially parallel to said perforate electrodes and provided with means for maintaining it substantially at the potential of said electron emitter, and curved baffles positioned between said perforate electrode and said collector electrode and having intervening passages between them substantially parallel to the path of a singly charged atom of said gaseous atmosphere moving under the combined influence of said magnetic field and the last-mentioned electric field.

GAYLORD W. PENNEY.

REFERENCES CITED

The following references are of record in the file of this patent:

UNITED STATES PATENTS

| Number | Name | Date |
|---|---|---|
| 1,948,384 | Lawrence | Feb. 20, 1934 |
| 2,221,467 | Bleakney | Nov. 12, 1940 |